(12) United States Patent
Segal et al.

(10) Patent No.: US 7,074,370 B2
(45) Date of Patent: Jul. 11, 2006

(54) PLASMA ASSISTED REACTOR

(75) Inventors: David Leslie Segal, Abingdon (GB); David Raybone, Stow-on-the-Wold (GB); James Timothy Shawcross, Charlbury (GB); Michael Inman, Abingdon (GB)

(73) Assignee: Accentus PLC, Didcot (GB)

( * ) Notice: Subject to any disclaimer, the term of this patent is extended or adjusted under 35 U.S.C. 154(b) by 404 days.

(21) Appl. No.: 10/182,627

(22) PCT Filed: Feb. 2, 2001

(86) PCT No.: PCT/GB01/00442

§ 371 (c)(1), (2), (4) Date: Aug. 1, 2002

(87) PCT Pub. No.: WO01/59270

PCT Pub. Date: Aug. 16, 2001

(65) Prior Publication Data

US 2004/0022701 A1    Feb. 5, 2004

(30) Foreign Application Priority Data

Jun. 30, 2000 (GB) .................................. 0015952

(51) Int. Cl.
*B01J 19/08* (2006.01)
(52) U.S. Cl. .................... 422/186.04; 60/275; 204/177
(58) Field of Classification Search ........... 422/186.04; 60/275; 204/177
See application file for complete search history.

(56) References Cited

U.S. PATENT DOCUMENTS 6,475,350 B1 * 11/2002 Palekar et al. .............. 204/164
6,475,944 B1 * 11/2002 Yang et al. .................. 502/84

FOREIGN PATENT DOCUMENTS

WO    WO 99/38603    *    8/1999

* cited by examiner

*Primary Examiner*—Kishor Mayekar
(74) *Attorney, Agent, or Firm*—William H. Holt

(57) ABSTRACT

A plasma assisted reactor for the removal of carbonaceous combustion products or for simultaneous removal of carbonaceous products and nitrogen oxides from the exhaust emissions from an internal combustion engine, wherein the reactor includes a gas permeable bed made at least primarily of active materials comprising perovskite or vanadate.

23 Claims, 4 Drawing Sheets

PLASMA ASSISTED REACTOR

This application is a U.S.C. 371 National Stage filing of PCT/GB01/00442 on Feb. 2, 2001.

The present invention relates to the plasma-assisted processing of gaseous media and in particular to the reduction of the emission of particulate including carbonaceous particulate, and nitrogen oxides, hydrocarbons including polyaromatic hydrocarbons, carbon monoxide and other regulated or unregulated combustion products from the exhausts of internal combustion engines.

BACKGROUND OF THE INVENTION

One of the major problems associated with the development and use of internal combustion engines is the noxious exhaust emissions from such engines. Two of the most deleterious materials, particularly in the case of diesel engines, are particulate matter (including carbonaceous particulate) and oxides of nitrogen ($NO_x$). Increasingly severe emission control regulations are forcing internal combustion engine and vehicle manufacturers to find more efficient ways of removing these materials in particular from internal combustion engine exhaust emissions. Unfortunately, in practice, it is found that techniques which improve the situation in relation to one of the above components of internal combustion engine exhaust emissions tend to worsen the situation in relation to the other. A variety of systems for trapping particulate emissions from internal combustion engine exhausts have been investigated, particularly in relation to making such particulate emission traps capable of being regenerated upon accumulation therein of particulate material.

Examples of such diesel exhaust particulate filters are to be found in European patent application EP 0 010 384; U.S. Pat. Nos. 4,505,107; 4,485,622; 4,427,418; and 4,276,066; EP 0 244 061; EP 0 112 634 and EP 0 132 166.

In all the above cases, the particulate matter is removed from diesel exhaust gases by a simple physical trapping of particulate matter in the interstices of a porous, usually ceramic, filter body, which is then regenerated by heating the filter body to a temperature at which the trapped diesel exhaust particulates are burnt off. In most cases the filter body is monolithic, although EP 0 010 384 does mention the use of ceramic beads, wire meshes or metal screens as well. U.S. Pat. No. 4,427,418 discloses the use of ceramic coated wire or ceramic fibres.

In a broader context, the precipitation of charged particulate matter by electrostatic forces also is known. However, in this case, precipitation usually takes place upon larger planar electrodes or metal screens.

GB patent 2,274,412 discloses a method and apparatus for removing particulate and other pollutants from internal combustion engine exhaust gases, in which the exhaust gases are passed through a bed of charged pellets of material, preferably ferroelectric, having high dielectric constant. In addition to removing particulates by oxidation, especially electric discharge assisted oxidation, there is disclosed the reduction of $NO_x$ gases to nitrogen, by the use of pellets adapted to catalyse the $NO_x$ reduction.

U.S. Pat. No. 5,609,736 discloses a method for decomposing volatile organic compounds using a non-thermal plasma reactor containing a bed of ferroelectric pellets coated with an oxidation catalyst. Also, U.S. Pat. Nos. 3,983,021, 5,147,516 and 5,284,556 disclose the catalytic reduction of nitrogen oxides. However, U.S. Pat. No. 3,983,021 is solely concerned with the reduction of NO to N in a silent glow discharge, the temperature of which is kept below a value at which the oxidation of N or NO to higher oxides of nitrogen does not occur.

Although, so-called contact bodies are used in the process of U.S. Pat. No. 3,983,021, and some of those disclosed may have some catalytic properties, catalysis does not appear to be a necessary feature of the process of U.S. Pat. No. 3,983,021. Other surface properties, such as adsorption on large surface area materials, are the basis of the process of U.S. Pat. No. 3,983,021.

U.S. Pat. No. 5,147,516 does refer to the use of catalysts to remove $NO_x$, but the catalytic materials involved are defined very specifically as being sulphur tolerant and deriving their catalytic activity from their form rather than their surface properties. The operating conditions are very tightly defined. There is no specific mention of the type, if any, of electric discharge involved. All that is disclosed is that the $NO_x$ removal depends upon electron-molecule interactions, facilitated by the structure of the 'corona-catalytic' materials not the inter-molecular interactions involved in the present invention.

U.S. Pat. No. 5,284,556 does disclose the removal of hydrocarbons from internal combustion engine exhaust emissions. However, the process involved is purely one of dissociation in an electrical discharge of the so-called 'silent' type, that is to say, a discharge which occurs between two electrodes at least one of which is insulated. The device described is an open discharge chamber, not a packed bed device. Mention is made of the possible deposition of a $NO_x$-reducing catalyst on one of the electrodes.

The specification of application WO 00/71866 describes the use of a dielectric barrier reactor for the processing of exhaust gases from internal combustion engines to remove nitrogenous oxides, particulate including carbonaceous particulate, hydrocarbons including polyaromatic hydrocarbons, carbon monoxide and other regulated or unregulated combustion products. A feature of this reactor is that the flow of the gaseous medium between entering and leaving the reactor has axial, radial and circumferential components. Reference is made to a gas permeable bed of a dielectric medium contained in the space between the electrodes and adapted to have catalytic properties to increase the efficiency of oxidation of particulates and/or reduction of nitrogen oxides.

In accordance with the invention the efficiency of oxidation of particulates and reduction of nitrogen oxides is improved by using a combination of catalyst materials and plasma discharge. Examples of these materials are metavanadates, pyrovanadates and perovskites. Metavanadate materials have the general formula $MVO_3$ where M is a cation for example an alkali metal cation while metal-substituted metavanadates have the general formula $M_{1-x}M^1_xVO_3$ where M is a cation for example an alkali metal cation and $M^1$ is a cation for example Cu. Examples of metavanadate ($MVO_3$) materials are $KVO_3$, $CsVO_3$, $RbVO_3$ and $CuVO_3$ and metal-substituted alkali-metal vanadates such as $K_{0.7}Cu_{0.3}VO_3$. Pyrovanadate materials have the general formula $M_4V_2O_7$ and $M_{4-4x}M^1_{4x}V_2O_7$ where M and $M^1$ are cations. Examples of pyrovanadates ($M_4V_2O_7$) are $CS_4V_2O_7$, $Rb_4V_2O_7$ and $K_4V_2O_7$.

The use of potassium and caesium vanadate and pyrovanadate materials for the low temperature combustion of carbon in simulated diesel emissions, down to as low as 225° C. for $Cs_4V_2O_7$ has been discussed by G Saracco et al in a paper 'Development of Catalysts Based on Pyrovanadates for Diesel Soot Combustion' in Applied Catalysis B: Environmental, volume 21, 233–242, 1999. Here dry soot almost free of any adsorbed hydrocarbons was generated from an ethyne burner.

The use of copper vanadates $CuVO_3$, $Cu_3(VO_4)_3$ and copper-substituted potassium vanadate $K_{0.7}Cu_{0.3}VO_3$ as carbon combustion catalysts in the absence and presence of metal chloride salts such as potassium chloride in which an amorphous carbon black powder was a simulant for diesel emissions have also been discussed by V Serra et al in a paper 'Combustion of carbonaceous materials by Cu—K—V based catalysts. II. Reaction mechanism' in Applied Catalysis B: Environmental, volume 11, 329–346, 1997. Carbon combustion temperatures as low as 382° C. compared with non-catalytic combustion temperatures of 616° C. were observed.

The materials under investigation in the above two papers were heated but not subjected to external influences such as electric fields in particular those associated with non-thermal plasmas and the design of practical reactors incorporating these materials for use in internal combustion engines was not considered.

Perovskites have the general formula $ABO_3$ where A and B are cations and A is the cation with the larger radius. There are many perovskite materials for example $LaMnO_3$, $LaAlO_3$, $SrZrO_3$, $BaCeO_3$ as discussed by T Shimuzu in a paper 'Partial Oxidation of Hydrocarbons and Oxygenates Compounds on Perovskite Oxides' in Catal. Rev-Sci. Eng., volume 34, 355–371, 1992 while other examples include $LaNiO_3$, $LaFeO_3$, $LaCrO_3$, $LaCoO_3$, $LaMnO_3$, $BaCrO_3$, $BaCoO_3$, $BaFeO_3$, $BaNiO_3$, $PbTiO_3$. Substitution by other metal cations of the A and or B sites yields perovskites with the general composition $A_{1-x}A^1{}_xB_{1-y}B^1{}_yO_3$ examples of which are $Ba_{0.8}Sr_{0.2}NiO_3$, $Ba_{0.8}Sr_{0.2}CrO_3$, $La_{0.8}Sr_{0.2}NiO_3$, $La_{0.9}K_{0.1}CoO_3$, $La_{0.9}K_{0.1}FeO_3$ and $La_{0.6}Cs_{0.4}CoO_3$. The latter composition has been described by Yang et al in a paper Simultaneous catalytic removal of NO and carbon particulates over perovskite-type oxides, in Journal of Industrial and Engineering Chemistry, volume 4, 263–269, December 1998. Another perovskite composition is $La_{0.8}Sr_{0.2}Mn_{0.5}Cu_{0.5}O_3$ as described by Duriez et al in the paper 'Simultaneous $NO_x$ reduction and soot elimination from diesel exhausts on perovskite-type oxide in catalysts' in Catalysts and Automotive Pollution Control III, Elsevier, 1995, edited by A Frennet and J-M Bastin, pages 137–147. In a general sense A and $A^1$ can include La, Sr, K, Na, Li, Cs, Pb and Ba while B and $B^1$ can include Ni, Cr, Co, Mn, Ti, Zr, Ce, Cu and V. Layered perovskite materials have the general formula $A_{2-x}A^1{}_xB_{1-y}B^1{}_yO_4$ or when $A=A^1$ and $B=B^1$, $A_2BO_4$ and examples are described in a paper by Y Tersoka et al in a paper 'Simultaneous Catalytic Removal of $NO_x$ by Diesel Soot and $NO_x$ by Perovskite-Related Oxides', in Catalysis Today, volume 27, 107–115, 1996 and in WO99/38603. Perovskite compositions are also described by VI Parvuleac et al in a paper 'Catalytic renoval of NO' in. Catalysis Today, volume 46, 233–316, 1998.

Perovskite materials of the form $ABO_3$ have been evaluated for the simultaneous removal of nitrogenous oxides and diesel soot particulates obtained by the incomplete combustion of diesel fuel as described by Y Teraoka et al in a paper 'Simultaneous Removal of Nitrogen Oxides and Diesel Soot Particulates Catalysed by Perovskite-Type Oxides' in Applied Catalysis B: Environmental, volume 5, L181–1185, 1995.

WO 98/32531 discloses use of a perovskite catalyst in combination with plasma in the formation of oxygenates or higher level hydrocarbons from methane Perovskite materials of the form $ABO_3$ have also been used for the conversion of oxidative and reductive gases, in exhaust gases to harmless gases as described in EP 0089199 A2 ('Catalysts for Converting Reductive and Oxidative Gases of Exhaust Gases into Innoxious Gases').

Perovskites were of the form $La_{(1-x)/2}Sr_{(1+x)/2}Co_{1-x}Me_xO_3$ in which Me is an element selected from the group consisting of Fe, Mn, Cr, V and Ti and x is a number between 0.15 and 0.90. Conversion of CO was carried out in a lean atmosphere containing oxygen while conversion of a mixture of CO, $NO_2$ and gaseous hydrocarbon or a mixture of CO and $NO_2$ was successfully achieved by the perovskite material at for example 300° C. for the conversion of CO alone. EP 0089199 does not describe the use of perovskite materials for conversion of diesel soot particulates in an exhaust gas.

Perovskite materials under investigation in the above examples were heated but not subjected to external influences such as electric fields in particular those associated with non-thermal plasmas and the design of practical reactors incorporating these materials for use in internal combustion engines was not considered by these authors.

BRIEF SUMMARY OF THE INVENTION

According to the present invention there is provided a reactor for the plasma assisted processing of internal combustion engine exhaust gases for simultaneous removal of unwanted carbonaceous combustion products and nitrogen oxides, the reactor including a reactor chamber adapted to be connected into the exhaust system of an internal combustion engine and including at least one gas permeable body of active material, means for exciting a non-thermal plasma in the exhaust gases and means for constraining the excited exhaust gases to flow through the body of active material, characterised in that the active material comprises at least primarily in combination a perovskite selected from the group consisting of perovskite materials having the general formula $A_{1-x}A^1{}_xB_{1-y}B^1{}_yO_3$ wherein $A,A^1$ are selected from the group consisting of La, Sr, K, Li, Na, Cs, Pb and Ba, $B,B^1$ are selected from the group consisting of Ni, Cr, Co, Mn, Ti, Zr, Cu and V, x is a number from 0 to 1 and y is a number from 0 to 1, and a vanadate selected from the group consisting of vanadate materials having the general formula $M_4V_2O_7$ or $M_{4-4x}M^1{}_{4x}V_2O_7$ wherein M and $M^1$ are selected from the group consisting of K, Cs and Rb and x is a number from 0 to 1 and $MVO_3$ $M_{1-x}M^1{}_xVO_3$ wherein M and $M^1$ are K, Cs, Rb, and Cu and x is a number from 0 to 1 for effecting simultaneous oxidation of carbonaceous combustion products and catalytic reduction of nitrogen oxides present in the exhaust gases.

The arrangement within the reactor chamber may be such that the plasma may be generated in the exhaust gases within the interstices of the body of active material, or if more than one body of active material is used, within the interstices of one of the bodies of active material.

Alternatively the exhaust gases can be excited into the plasma state prior to their passage through the said body of active material.

Suitable elements for the components $A,A^1$ include but are not restricted to La, Sr, K, Na, Li, Cs, Pb and Ba and suitable elements for the components $B,B^1$ of the perovskite active materials include but are not restricted to Ni, Cr, Co, Fe, Mn, Ti, Zr, Ce, Cu and V.

Examples of pyrovanadates $(M_4V_2O_7)$ are $Cs_4V_2O_7$, $Rb_4V_2O_7$ and $K_4V_2O_7$.

Examples of metavanadate ($MVO_3$) materials are $KVO_3$, $CsVO_3$, $RbVO_3$ and $CuVO_3$ and metal-substituted alkali-metal vanadates such as $K_{0.7}Cu_{0.3}VO_3$.

The reactor may have a single reactor chamber in which are situated both the means for exciting the exhaust gases into the plasma state and the gas permeable body of active material. Alternatively, the reactor chamber may be divided into two regions in one of which the exhaust gases are excited into the plasma state and in the other of which the excited exhaust gases are contacted with the active material. Alternatively exhaust gases can be contacted with the active materials before they are excited into the plasma state.

Also according to the present invention there is provided a method of treating exhaust gases from an internal combustion engine for the simultaneous removal of unwanted carbonaceous combustion products and nitrogen oxides therefrom including the operations of exciting the exhaust gases into a plasma state and passing the excited exhaust gases through a gas permeable body of active material, characterised in that the active material consists at least primarily in combination a perovskite selected from the group consisting of perovskite materials having the general formula $A_{1-x}A^1_xB_{1-y}B^1_yO_3$ wherein $A, A^1$ are selected from the group consisting of La, Sr, K, Li, Na, Cs, Pb and Ba, $B, B^1$ are selected from the group consisting of Ni, Cr, Co, Mn, Ti, Zr, Cu and V, s is a number from 0 to 1 and y is a number from 0 to 1, and a vanadate selected from the group consisting of vanadate materials having the general formula $M_4V_2O_7$ or $MVO_3$ or $M_4M^1_{4x}Y_2O_7$ and $M_{1-x}M^1_xVO_3$ wherein M is selected from the group consisting of K, Cs and Rb and $M^1$ is selected from the group consisting of K, Cs and Rb Cu and x is a number from 0 to 1.

The exhaust gases may be excited into a plasma state prior to their passage through the gas permeable body of perovskite or vanadate materials, or within the interstices of the gas permeable body of perovskite or vanadate containing material.

The gas permeable body of perovskite and vanadate-containing material may include other materials such as zeolites which are active for the reduction of nitrogen oxides contained in the exhaust gases-as described in WO 99/12638.

The plasma region of the reactor may be a pellet bed reactor such as is described in GB 2,274,412, a corona discharge reactor such as a pulsed corona or continuous wave corona reactor examples of which are described in our specifications GB 2282738 B and WO99/15267, a dielectric barrier reactor, a surface barrier reactor as described in specification WO 00/43102 or any other non-thermal or thermal reactor for the plasma assisted treatment of the exhaust gases from internal combustion engines to remove noxious combustion products therefrom. The plasma generating region may include additional catalytic components besides the active material described here or be installed as part of an emissions control system employing catalysts or other emission control devices.

The gas permeable bed of active material, perovskite or vanadate can be in the form of spheres, pellets, extrudates, fibres, sheets, wafers, frits, meshes, coils, foams, membrane, ceramic honeycomb monolith or granules or as a coating or contained within a dielectric, polymeric or metallic material in any of the above shapes. For slightly soluble materials such as vanadates, containment in the pores of a ceramic foam can be used. The materials of the present invention can also act as selective filters as described in the specification of application PCT/GB00/03943.

Utilising the combination of components, plasma together with perovskite and vanadate mixtures offers advantages over the employment of one component alone.

Thus a material which is not significantly catalytic at a low temperature for the oxidation of carbonaceous particulate or reduction of nitrogenous oxides by thermal mechanisms, may develop or exhibit enhanced catalytic properties for these processes when exposed to a plasma. This nay be due, for example to activation by O atoms or other plasma generated species such as $O_2^-$ molecular ions or OH radicals or nitrogen dioxide. Catalytic or non-catalytic material properties can be further augmented by the electric field or other charged species present in or adjacent to the plasma region.

In addition the combination of plasma and catalyst offers synergies for the combined system being more efficient than either mode of operation alone for removal of unwanted emissions from internal combustion engine exhaust. The combined plasma/catalyst system may for example operate over a wider temperature range than thermal catalysts only. Further the presence of catalyst within the plasma or in combination with a plasma reactor, which may be packed or unpacked, provides for a reduction in the electrical power requirement of the plasma reactor at temperatures at which the catalyst is naturally active. This is because, at such temperatures, the catalyst is efficient enough without additional plasma enhancement, When the exhaust gases contain nitrogenous oxides and carbonaceous combustion products such as carbonaceous particulates that are derived from an internal combustion engine supplied with combustion fuel, the exhaust gases can contain hydrocarbon, either added separately or residually derived from the fuel combustion. The exhaust gases also can contain a chemical additive acting as a carbon combustion catalyst that is either present initially in the fuel or added separately to the exhaust gases and whose function is to lower the combustion temperature and/or increase the rate of removal of carbonaceous material. Carbon combustion catalyst to be added to the fuel can be encapsulated within or bound to a fugitive additive that chemically decomposes during or shortly after fuel combustion thus releasing the additive into the fuel or exhaust. Examples of carbon combustion catalysts are alkali-metal salts such as lithium nitrate described in GB 2 232 613 B, cerium oxide, alkali-metal doped lanthanum oxide-vanadium oxide in addition to the active materials, perovskites and vanadates described here. The mode of operation of such catalysts is described in WO 00/43102.

BRIEF DESCRIPTION OF THE SEVERAL VIEWS OF THE DRAWINGS

The invention will now be described, by way of example, with reference to the accompanying drawings in which, FIG. 3 and FIG. 4 are described in application WO 00/71866.

DETAILED DESCRIPTION OF THE INVENTION

Figure 1:
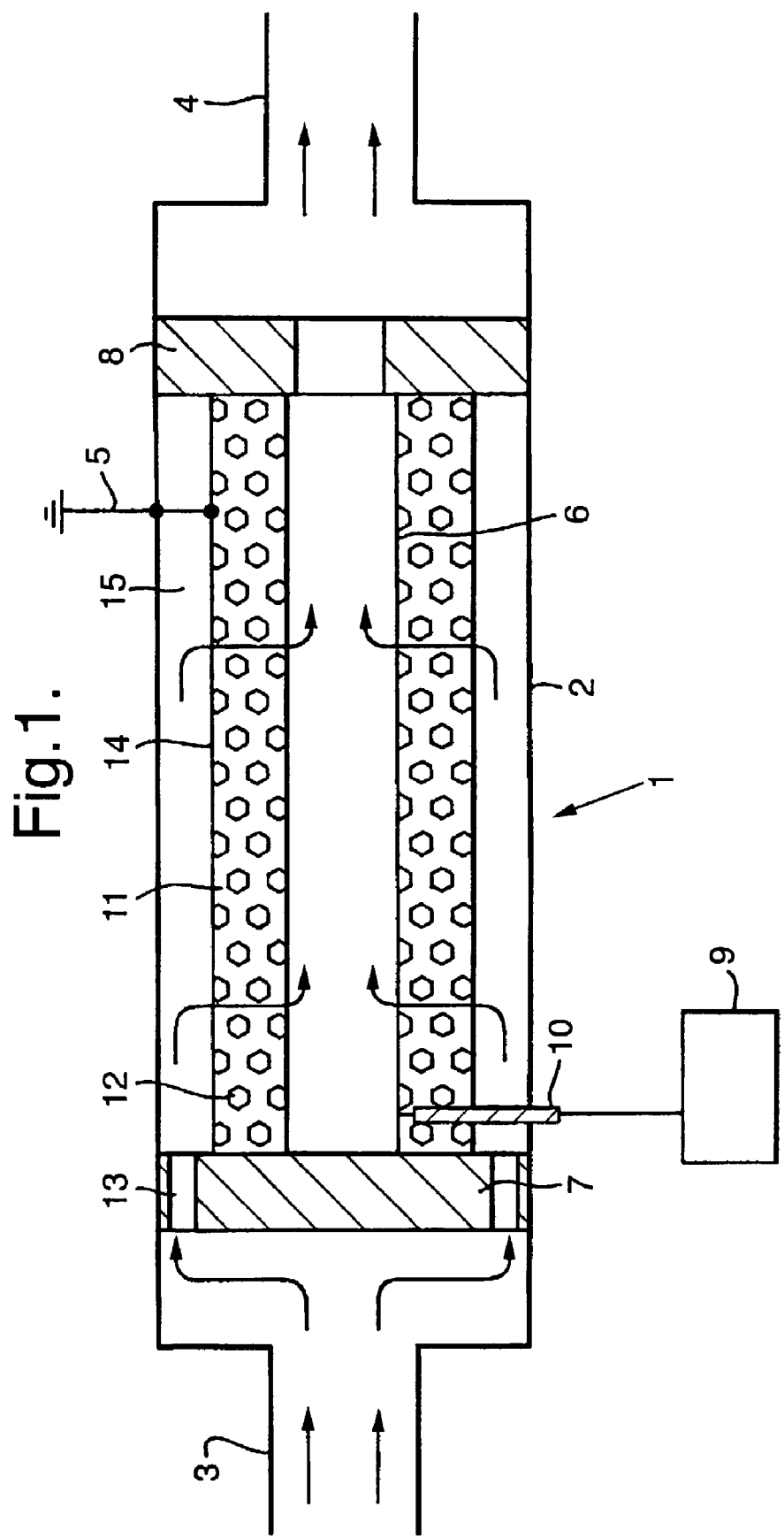
FIG. 1 is a longitudinal section of a reactor embodying the invention for simultaneous removal of carbonaceous combustion products and nitrogen oxides from the exhaust emissions from an internal combustion engine.

Referring to FIG. 1 of the drawings, a reactor for simultaneous removal of carbonaceous combustion products and nitrogen oxides from the exhaust gases from an internal combustion engine consists of a cylindrical stainless steel chamber 2 which has an inlet stub 3 and an outlet stub 4 by means of which it can be connected into the exhaust system of an internal combustion engine. The chamber 2 is arranged, in use, to be connected to an earthing point 5. Perforated cylindrical stainless steel inner and outer electrodes 6 and 14 are positioned co-axially within the chamber 2 by means of two electrically insulating supports 7 and 8. The insulating support material can be made of a ceramic material such as alumina or MICATHERM (Registered Trade Mark) as described in WO99/20373. The space 11 bounded by the electrodes 6 and 14 and the supports 7 and 8 is filled, in this example, with a bed of gas permeable active material of vanadate and perovskite mixture illustrated highly diagrammatically at 12.

The bed of gas permeable active material, perovskite and vanadate can be in the form of spheres, pellets, extrudates, fibres, sheets, wafers, frits, meshes, coils, foams, membrane, ceramic honeycomb monolith or granules or as a coating, on or contained within a dielectric material in any of the plasma shapes. For slightly active soluble material such as vanadates containment in the pores of a ceramic foam can be used. Examples of such foams are, but not exclusively, alumina foams produced by Porvair Advanced Materials, Hendersonville, N.C., USA. The upstream end of the inner electrode 6 is arranged to be connected via an insulating feedthrough 10 to a source 9 of an electrical potential sufficient to excite a plasma in the exhaust gases in the interstices between the active material 12. The plasma generating means 9 is not shown in detail because it can take a number of forms.

A convenient potential for the excitation of the plasma is of the order of kilovolts to tens of kilovolts and repetition frequencies in the range 50 to 5000 Hz, although higher frequencies of the order of tens of kilohertz can be used. Pulsed direct current is convenient for automotive use, but alternating potentials for example triangular or sine waves of the same or similar characteristics can be used.

The support 7 near the inlet stub 3 has a number of axial holes 13 disposed regularly around its periphery so that incoming exhaust gases are constrained to pass into the space 15 between the outer electrode 14 and the chamber 2 of the reactor 1 and thence radially through the bed 12 of active material before passing through the inner electrode 6 and leaving the chamber 2 via the exhaust stub 4.

Examples of vanadates such as metavanadate and pyrovanadate compositions that can be used in the bed of active material are $KVO_3$, $CsVO_3$, $RbVO_3$, $K_4V_2O_7$, $Cs_4V_2O_7$, $Rb_4V_2O_7$. Metal-substituted alkali-metal vanadates for example $K_{0.7}Cu_{0.3}VO_3$ are also useful materials for the removal of carbonaceous material, while examples of perovskites which are useful materials for the simultaneous removal of carbonaceous materials and nitrogen oxides are $Ba_{0.8}Sr_{0.2}NiO_3$, $Ba_{0.8}Sr_{0.2}CrO_3$, $La_{0.8}Sr_{0.2}NiO_3$, $La_{0.9}K_{0.1}CoO_3$, $La_{0.9}K_{0.1}FeO_3$, $La_{0.6}Cs_{0.4}CoO_3$ and $La_{0.8}Sr_{0.2}Mn_{0.5}Cu_{0.5}O_3$.

Figure 2:
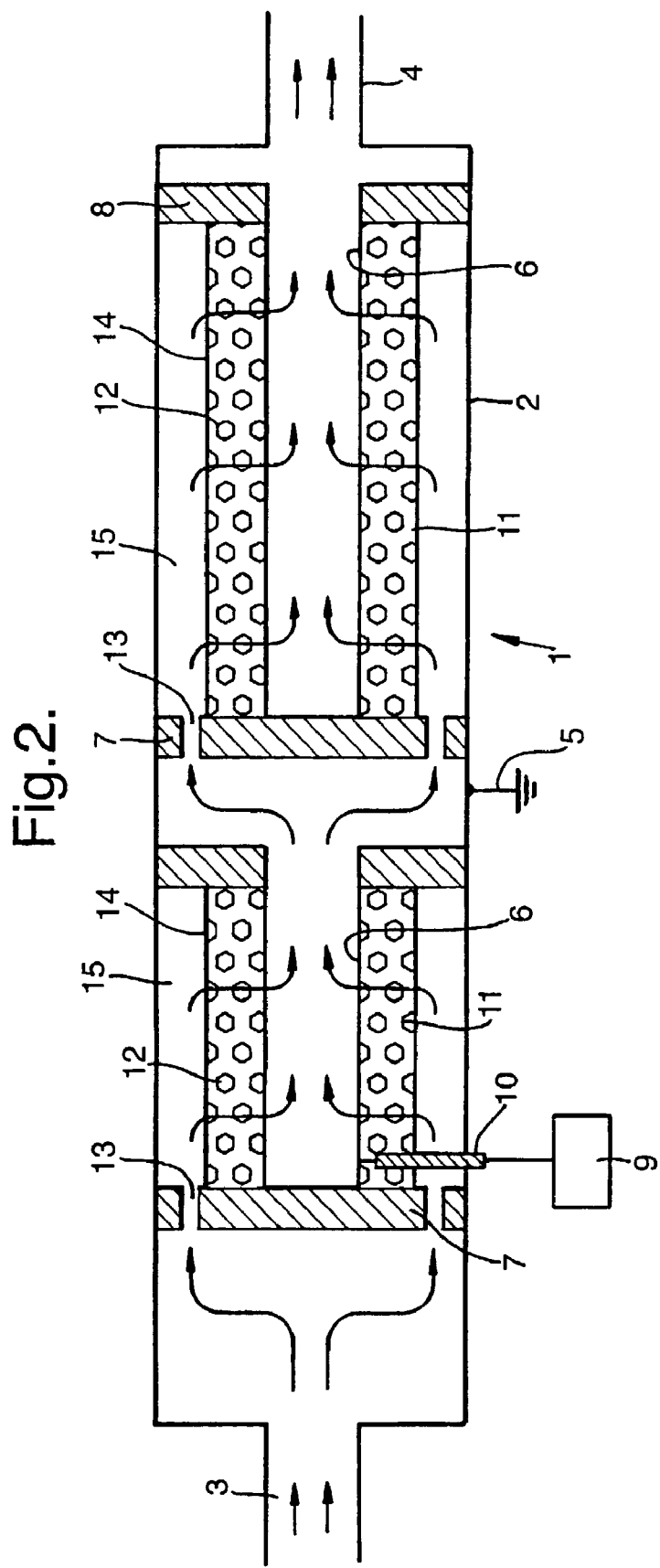
FIG. 2 is a longitudinal section of a second embodiment of the invention.

Other embodiments are known in which the reactor can be separated into chambers so that the gaseous medium can be contacted with an active material before entering the plasma region of the reactor, or can be excited in the plasma region and then be contacted with the active material housed in the plasma region, or can be excited in the plasma region and then passed through the active material that is housed outside of the plasma region of the reactor. As an example of this FIG. 2 shows a second embodiment of the invention in which those components which are similar to corresponding components of the first embodiment have the same reference numerals. The reactor chamber 1 is extended and contains a first plasma excitation reactor similar to that described above with reference to FIG. 1, and a second reactor chamber similar in layout to the first reactor but in which there are no electrical connections to the bed of active material 11 of vanadate and perovskite material, so that exhaust gases can be excited into a plasma state in the first chamber before contacting the active material. The arrangement can be reversed so that the exhaust gases can be contacted with an active material which does not require the exhaust gases to be excited, before being contacted in an excited state with the active materials of the present invention. Also a chamber can be left empty of active material when in use. Other arrangements of chambers are described in FIG. 8 of publication WO99/12638 and arrangements that use axial flow through the permeable bed of material can also be used. An arrangement involving an unpacked plasma region followed by catalyst can also be used.

Figure 3:
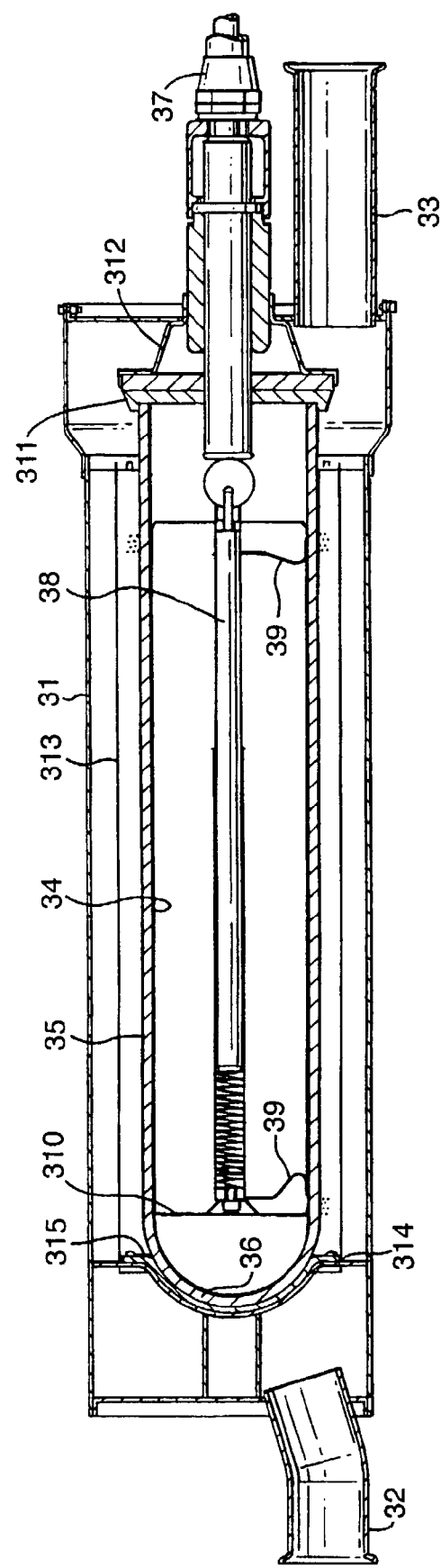
FIG. 3 is a longitudinal section of a third embodiment of the invention for the simultaneous removal of carbonaceous combustion products and nitrogen oxides from the exhaust emissions from an internal combustion engine and FIG. 4 is a schematic view showing the gas path through the embodiment shown in FIG. 3. Both

Referring to FIG. 3, a second reactor for the plasma assisted processing of the exhaust emissions from internal combustion engines to remove noxious components therefrom consists of a reactor chamber 31 which has inlet and outlet stubs 32,33, respectively, by means of which it can be incorporated into the exhaust system of an internal combustion engine, as before.

Inside the reactor chamber 31 there is an inner electrode 34 which is supported within a dielectric tube 35, made for example out of α-alumina which has its upstream end closed by a spherical dome 36 to facilitate the flow of exhaust gases through the reactor. The inner surface of the dielectric tube can be metallised with a metal coating in order to increase the physical contact between the electrode and dielectric tube although in this example, the inner electrode 34 is conveniently provided by a deposited electrically conducting layer of silver on the inner surface of the dielectric tube 35. High voltage connection via the high voltage input terminal 37 is made through a spring loaded telescopic tube assembly 38 and spring contacts 39. Load from the sprung telescopic tube assembly 38 is received by a load spreader plate 310, which is connected to the conducting layer of silver forming the inner electrode 34. The materials, including the spring are required to operate at elevated temperatures, and the spring must have low creep at such temperatures. A preferred material for the spring is an Inconel alloy such as X750. Alumina end flange 311 is shaped to receive and locate the end of the dielectric tube 35 and is itself located by a sprung metal clip 312.

A potential of the order of kilovolts to tens of kilovolts and repetition frequencies in the range 50 to 5000 Hz can be applied to the inner electrode 34 through the high voltage input terminal 37. Concentric with the inner electrode 34 and dielectric tube 35 is a grounded outer electrode 313 made for example of stainless steel. At the inlet end of the reactor the spherical dome of the dielectric tube 35 is in contact with a compliant heat resistant material 314 that rests in the curved part of the outer electrode 313 and held in place by a metallic ring 315 with a series of screws.

Figure 4:
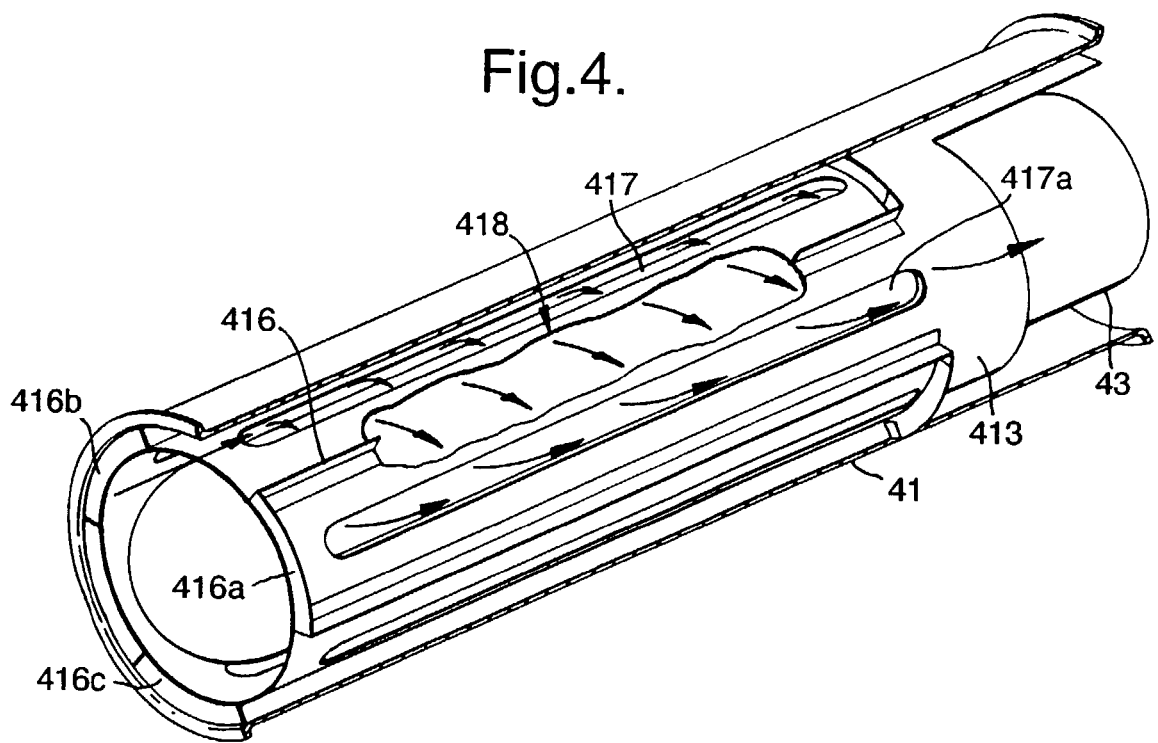

As shown in FIG. 4, the outer electrode 413 has a series of baffles 416 and slots 417,417a. The baffles 416 extend from the outer electrode 413 to the inner surface of the wall of the reactor chamber 41 and act as grounding connections as well as causing the exhaust gases to follow a convoluted path which has both axial, and circumferential components and being at least partially helical. There is also a radial component of flow, initially inwardly as the gas transfers from outside the outer electrode 413 to the space between the electrode 413 and dielectric tube 43 which corresponds to dielectric tube 35 in FIG. 3, and then outwardly as the gas returns to exit from outside the outer electrode 413. Thus there is also a spiral component in the flow.

The baffle 416 is arranged to divide the space between the electrode 413 and the reactor chamber 41 into six segments. At the gas inlet end three of these segments are closed off at 416*a*, 416*b* and 416*c* to axial gas flow and the remaining three segments are open to axial gas flow into the space between the electrode 413 and the reactor chamber 41. These latter three segments are closed off by the baffle 416 at the gas outlet end of the reactor. Consequently the gas is forced to pass via slot 417 radially into the space between the electrodes 413 and 43 then passing in at least a partially helical manner before passing radially via the next slot 417*a* into the next segment of space between electrode 413 and reactor chamber 41. The baffle 416 leaves open this segment at the gas outlet end, allowing exhaust of the treated gas to exit the reactor. Thus it will be seen that the exhaust gases both enter and leave the main part of the reactor 41 along the surface of the outer electrode 413. Thus for a given gas velocity, the residence time of the exhaust gases in the electric field is increased compared with either purely axial or radial flow. Note that in FIG. 4 part of the electrode 413 has been shown cut away at 418. This cut away is shown in the Figure only to illustrate the flow of the exhaust gases as they pass between the electrodes and does not represent a structural feature of the reactor.

The embodiments of reactor described in these examples may include further catalytic components, or be installed as part of an emissions control system employing catalysts or other emission control devices for the plasma assisted treatment of the exhaust gases from internal combustion engines. Such other emission control devices may comprise exhaust gas recirculation (EGR), variations in ignition timing, fuel injection timing and fuel injection pulse rate shaping. The plasma generation means is not shown in detail but an example is shown in WO 00/50746. An article 'Stop go systems get the green light' in European Automotive Design, April 1998, pages 24–26 describes an example of an integrated starter alternator damper system (ISAD). Such an ISAD can be used as part of a power supply system to power a plasma assisted emissions control system of which a reactor as described herein is part. In addition, other power sources such as but not limited to single/multiple output alternator technologies e.g. 14 V or 14V/42V, fuel cells, gas turbines, solar cells and heat exchangers can be the primary or part-provider of the electrical-generating power source that can also be used to power the power supply system for the reactor.

Zeolite materials, aluminas, metal-doped aluminas and metal oxide containing aluminas are particularly useful for the treatment of nitrogenous oxides and can be used in conjunction with vanadate and perovskite material mixtures to increase reduction of nitrogenous oxides to nitrogen. Examples of zeolites are those known as ZSM-5, Y, beta, mordenite all of which may contain iron, cobalt or copper with or without additional catalyst promoting cations such as cerium and lanthanum. Other examples of zeolites are alkali metal containing zeolites, in particular sodium-Y zeolites that are particularly useful for treatment of nitrogenous oxides. Ferrierites, in particular silver containing ferrierite with silver contents up to 10 weight percent, are also particularly useful zeolite materials for the removal of nitrogen oxides. The zeolite material and aluminas can be in the form of spheres, pellets, extrudates, fibres, sheets, wafers, frits, meshes, coils, foams, membrane, ceramic honeycomb monolith or granules or as a coating on or contained within a dielectric, polymeric or metallic material in any of the above shapes.

Exhaust gases containing hydrocarbon reductant residually-derived from the fuel combustion, or added separately, or including a nitrogen-containing reductant for the reduction of nitrogenous oxides and/or including a carbon combustion catalyst, as described earlier, can be passed through the plasma region of the plasma reactor which contains materials active for the removal of carbonaceous material or nitrogen oxides or both, or can be passed through a bed of such materials before entering the plasma region, or can be passed over one or more of these materials after passing through the plasma region. When a nitrogen-containing reductant is used, the reductant can be added to the exhaust gases leaving the plasma region of the reactor and before their passage through the catalytically second chamber of the reactor.

What is claimed is:

1. A reactor for the plasma assisted processing of internal combustion engine exhaust gases for simultaneous removal of unwanted carbonaceous combustion products and nitrogen oxides, the reactor including a reactor chamber adapted to be connected into the exhaust system of an internal combustion engine and including at least one gas permeable body of active material, means for exciting a non-thermal plasma in the exhaust gases and means for constraining the excited exhaust gases to flow through the body of active material, wherein the active material comprises at least primarily in combination a perovskite selected from the group consisting of perovskite materials having the general formula $A_{1-x}A^1{}_xB_{1-y}B^1{}_yO_3$ wherein $A,A^1$ are selected from the group consisting of La, Sr, K, Li, Na, Cs, Pb and Ba, $B,B^1$ are selected from the group consisting of Ni, Cr, Co, Mn, Ti, Zr, Cu and V, x is a number from 0 to 1 and v is a number from 0 to 1, and a vanadate selected from the group consisting of vanadate materials having the general formula $M_4V_2O_7$ or $M_{4-4x}M^1{}_{4x}V_2O_7$ wherein M and $M^1$ are selected from the group consisting of K, Cs and Rb and x is a number from 0 to 1 and $MVO_3$ or $M_{1-x}M^1{}_xVO_3$ wherein M and $M^1$ are K, Cs, Rb, and Cu and x is a number from 0 to 1 for effecting simultaneous oxidation of carbonaceous combustion products and catalytic reduction of nitrogen oxides present in the exhaust gases.

2. A reactor according to claim 1, wherein the components $M,M^1$ of the vanadate materials having the general formula $M_xM^1{}_{1-x}VO_3$ are the same.

3. A reactor according to claim 1, wherein the components $M,M^1$ of the vanadate materials having the general formula $M_{1-x}M^1{}_xVO_3$ are alkali metals.

4. A reactor according to claim 3 wherein the components $M,M^1$ of the vanadate materials are K and Cu respectively.

5. A reactor according to claim 4 wherein the vanadate material has the formula $k_{0.7}Cu_{0.3}VO_3$.

6. A reactor according to claim 1, wherein a gas permeable bed of active material is contained between gas permeable electrodes by means of which there can be applied across the gas permeable bed of active material a potential difference sufficient to excite the exhaust gases into the plasma state in the interstices of the gas permeable body of active material.

7. A reactor according to claim 1, wherein there is included means for exciting the exhaust gases into the plasma state prior to its passage through the bed of active material.

8. A reactor according to claim 7 wherein the means for exciting the exhaust gases into the plasma state includes a gas permeable body of dielectric material contained between gas permeable electrodes by means of which there can be applied across the gas permeable body of dielectric material a potential sufficient to excite the exhaust gases into the plasma state in the interstices of the gas permeable body of dielectric material.

9. A reactor according to claim 8, wherein the dielectric material is adapted to participate in the oxidation of carbonaceous combustion products or the simultaneous removal of carbonaceous combustion products and nitrogen oxides present in the exhaust gases.

10. A reactor according to claim 1, wherein the gas permeable body of active material also includes a zeolite material for contributing to the reduction of nitrogen oxides.

11. A reactor according to claim 10 wherein the zeolite material includes at least one type selected from the group including the zeolite known as ZSM-5, Y, beta, mordenite, ferrierite and alkali metal-containing zeolites.

12. A reactor according to claim 11 wherein the zeolite materials contain iron, cobalt or copper.

13. A reactor according to claim 11 wherein the zeolite material includes a catalysis-promoting cationic species.

14. A reactor according to claim 13 wherein the catalysis promoting cationic species is cerium or lanthanum.

15. A reactor according to claim 11 wherein the zeolite material is a sodium-Y zeolite.

16. A reactor according to claim 10 wherein the zeolite material is a silver containing ferrierite.

17. A reactor according to claim 16 wherein the ferrierite contains up to ten weight per cent of silver.

18. A method of treating exhaust gases from an internal combustion engine for the simultaneous removal of unwanted carbonaceous combustion products and nitrogen oxides therefrom including the operations of exciting the exhaust gases into a plasma state and passing the excited exhaust gases through a gas permeable body of active material, wherein the active material comprises at least primarily in combination a perovskite selected from the group consisting of perovskite materials having the general formula $A_{1-x}A^1{}_xB_{1-y}B^1{}_yO_3$ wherein $A,A^1$ are selected from the group consisting of La, Sr, K, Li, Na, Cs, Pb and Ba, $B,B^1$ are selected from the group consisting of Ni, Cr, Co, Mn, Ti, Zr, Cu and V, x is a number of 0 to 1 and v is a number from 0 to 1, and a vanadate selected from the group consisting of vanadate materials having the general formula $M_4V_2O_7$ or $MVO_3$ or $M_{4x}M^1{}_{4x}V_2O_7$ and $M_{1-x}M^1{}_xVO_3$ wherein M is selected from the group consisting of K, Cs and Rb and $M^1$ is selected from the group consisting of K, Cs and Rb Cu and x is a number from 0 to 1.

19. A method according to claim 18 wherein the exhaust gases are excited into a plasma state prior to their passage through the said gas permeable body of active material.

20. A method according to claim 18 wherein the gas permeable body of perovskite and vanadate containing material includes other material active to promote the reduction of nitrogen oxides present in the said exhaust gases.

21. A method according to claim 20 wherein the said other material active to promote the reduction of nitrogen oxides present in the exhaust gases is a zeolite material.

22. A method according to claim 21 wherein the zeolite material is included in the said body primarily of active perovskite and vanadate material.

23. A method according to claim 18, wherein a hydrocarbon reductant material is included in the exhaust gases prior to their excitation into the plasma state, the hydrocarbon reductant material being adapted to produce under the influence of the plasma species which enhance the reduction of nitrogen oxides contained in the exhaust gases.

* * * * *